United States Patent
Swander

(10) Patent No.: US 7,536,719 B2
(45) Date of Patent: May 19, 2009

(54) METHOD AND APPARATUS FOR PREVENTING A DENIAL OF SERVICE ATTACK DURING KEY NEGOTIATION

(75) Inventor: Brian D. Swander, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 618 days.

(21) Appl. No.: 10/337,763

(22) Filed: Jan. 7, 2003

(65) Prior Publication Data

US 2004/0133798 A1 Jul. 8, 2004

(51) Int. Cl.
*G06F 17/00* (2006.01)
(52) U.S. Cl. .......................................... 726/14; 726/13
(58) Field of Classification Search .................... 713/13, 713/14
See application file for complete search history.

(56) References Cited

U.S. PATENT DOCUMENTS

| | | | | |
|---|---|---|---|---|
| 2002/0046348 | A1* | 4/2002 | Brustoloni | .................. 713/201 |
| 2004/0088537 | A1 | 5/2004 | Swander et al. | |
| 2004/0143758 | A1 | 7/2004 | Swander et al. | |

FOREIGN PATENT DOCUMENTS

WO   WO 00/78008 A1   12/2000

OTHER PUBLICATIONS

IP Security Protocol Working Group (IPSEC) Internet Draft, Category: Standards track, Expires: Jun. 2003—UDP Encapsulation of IPsec Packets draft-ietf-ipsec-udp-encaps-05.txt, Dec. 2002, 10 pp.
Network Working Group, Request for Comments: 2406, Obsoletes: 1827, Category: Standards Track—IP Encapsulating Security Payload (ESP), Nov. 1998, 20 pp.
IPSec Working Group, Internet-Draft, Category: Informational, <draft-ietf-ipsec-nat-reqts-02.txt>, Aug. 18, 2002—IPsec-NAT Compatibility Requirements, 15 pp.

(Continued)

*Primary Examiner*—Kambiz Zand
*Assistant Examiner*—Aubrey H Wyszynski
(74) *Attorney, Agent, or Firm*—Wolf, Greenfield & Sacks, P.C.

(57) ABSTRACT

The invention provides a method for preventing a denial-of-service attack on a responder during a security protocol key negotiation. The responder receives key negotiation requests designating a source port and source IP address. The responder only maintains state when a key negotiation request is received from an initiating computer with a valid, non-spoofed, source IP address. The responder further limits the number of in-process key negotiations for which the responder maintains state. If a key negotiation request is received from a valid source IP address and the responder has at least one established security association for that source IP address, the responder limits the number of ongoing key negotiations to a maximum number on a per port address basis for that source IP address. If an established security association does not exist for that source IP address, the responder limits the number of ongoing key negotiations to a maximum number based on the source IP address regardless of the source port address.

19 Claims, 4 Drawing Sheets

OTHER PUBLICATIONS ipSEC Express—SSH IPSEC Express, White Paper, Version 2.0, Mar. 1999, 23 pp.

Network Working Group, Request for Comments: 2401, Obsoletes: 1825, Category: Standards Track—Security Architecture for the Internet Protocol, 58 pp.

IPSEC Working Group, Internet-Draft, draft-ieft-ipsec-ike.01.txt: The Internet Key Exchange (IKE), <draft-ietf-ipsec-ike-01.txt>, 36 pp.

P. Srisuresh et al.; IP Network Address Translator (NAT) Terminology and Considerations; Network Working Group, 1999; pp. 1-30.

* cited by examiner

METHOD AND APPARATUS FOR PREVENTING A DENIAL OF SERVICE ATTACK DURING KEY NEGOTIATION

TECHNICAL FIELD

This invention relates generally to security protocols and, more particularly, relates to a method and system that prevents a denial of service attack at a network device during a key negotiation conducted according to a security protocol.

BACKGROUND OF THE INVENTION

The popularity of the Internet and other private and public networks has resulted in increasing reliance on electronic transmission of data for both business and personal reasons. In many instances the data transmitted is of a personal or confidential nature. A user may provide credit card or other account information over the network to purchase goods or services. Sensitive and confidential business communications, emails, and documents are also transmitted over networks. It is necessary to employ security measures to protect the security of such data routed over the networks.

A popular protocol for electronically transmitting data is the Internet Protocol (IP). However, IP provides little security as the data within IP packets is not encrypted and may be accessed, viewed, and even altered by an eavesdropper. Thus, IP does not protect the confidentiality or authenticity of the data. To address these shortcomings, a set of extensions to IP, referred to as the Internet Protocol Security (IPSec) suite, were developed by the Internet Engineering Task Force (IETF). The IPSec suite includes protocols such as authentication header (AH), encapsulating security protocol (ESP), and key management and exchange protocol (IKE).

The ESP protocol, documented mainly in IETF Request for Comments (RFC) 2406, is an authenticating and encrypting protocol that uses cryptographic mechanisms to provide integrity, source authentication, and confidentiality of data. The AH protocol, documented mainly by IETF RFC 2402, is an authentication protocol that uses a hash signature in the packet header to validate the integrity of the packet data and authenticity of the sender.

The IKE protocol, documented mainly in IETF RFC 2409, provides a method for an initiating computer, referred to as an initiator, and a responding computer, referred to as a responder, to negotiate security settings used with the AH and ESP protocols. The negotiated security settings form a data structure called a security association (SA). The SA defines parameters such as an authentication algorithm, encryption algorithm, keys, and the lifetime of keys, used by ESP or AH to protect the contents of the IP packet. Because ESP and AH require an established SA, an IKE negotiation is executed before the ESP or AH protocols are used by the initiator and responder.

The IKE negotiation includes two phases. In a first phase, known as "main mode," the initiator and the responder establish a secure channel for conducting IKE negotiation, referred to as an IKE SA. In the second phase, known as "quick mode," the initiator and the responder negotiate general purpose SAs over the secure channel established in the first phase. The main mode and quick mode phases of the IKE negotiation each include a series of IKE packets exchanged between the initiator and responder. According to the IKE protocol, each IKE packet includes a User Datagram Protocol (UDP) header with a source and a destination port address. Typically, the UDP header includes source and destination ports of 500 as that is the Internet Assigned Numbers Authority (IANA) port for IKE packets.

The IKE main mode negotiation begins when the initiator sends an initial IKE request to the responder that includes an SA with proposed parameters. The responder responds with an SA that includes the parameters to which the responder agrees. The initiator and responder then exchange a second pair of messages that include key exchange data for a Diffie-Hellman key exchange. Finally, the initiator and responder exchange a third pair of messages, which are used to authenticate the initiator and responder. The IKE protocol requires the responder to maintain state, i.e. store information, such as the proposed and agreed upon SA parameters throughout the entire main mode negotiation process. Thus, each ongoing IKE negotiation consumes responder resources.

Recent proposals suggest methods that may be used to implement the IPSec protocol suite in network environments where a network address translation device (NAT) is employed. An example of such a network environment includes a NAT connected to a plurality of network devices over an internal network, such as a Local Area Network (LAN), as an interface between the internal network and an external network, such as the Internet. Each network device has a private source IP address that is valid on the internal network but not valid on the external network. When a first network device sends an IP packet destined for the external network, the NAT intercepts the packet and replaces the private source IP address with an IP address valid on the external network, such as a public IP address assigned to the NAT. The NAT performs the same process for each network device, and in each case uses the same source public IP address. The use of NAT advantageously allows multiple network devices to communicate over the external network with a single source IP address.

The NAT may also change a source port in a transport layer header, e.g. TCP or UDP header, within the IP packet to ensure that each initiator sends packets with a unique combination of IP addresses and ports over the external network. Thus, when the initiator is behind a NAT and sends an IKE packet destined for a responder on the external network, the NAT typically changes the source port from 500 to some other value, which may be selected from one of over 64,000 ports. The unique combination of source port and IP addresses provides the NAT with a mechanism to route response IP packets sent from the external network to the proper network device on the internal network.

The IKE main mode negotiation process provides a malicious user with an opportunity to mount denial-of-service (DOS) attacks on a responder. For example, a malicious user can send a large number of IKE requests with spoofed, i.e. false, IP addresses. As previously described, each IKE request consumes responder resources because the IKE protocol requires the responder to maintain state throughout the IKE main mode negotiation. By sending a sufficient number of IKE requests, the attacker can monopolize the responder's resources and prevent or substantially limit the its ability to process IKE requests from legitimate network devices.

The implementation of IPSec in NAT environments creates even further opportunities for an attacker to mount a DOS attack during the IKE negotiation process. Because of NAT, the responder receives IKE requests with UDP headers that include the range of possible source ports and not just port 500. Moreover, proposals exist for using destination ports other than 500 in the IKE packet UDP header, such as described in copending U.S. patent application Ser. No. 10/284,931 entitled "Method and Apparatus for Traversing a Translation Device with a Security Protocol" thereby increasing the number of port combinations that can be used. Thus, even if the responder limits the IKE requests for which it maintains state to IKE requests sent from a device using its actual IP address, a malicious user can still flood the responder with IKE requests from varying ports thereby mounting a DOS attack.

From the foregoing, it is apparent that a new method is needed to protect a responder from DOS attacks conducted during key exchange protocol negotiations.

SUMMARY OF THE INVENTION

In accordance with the foregoing, a method and system are provided that protect a responder from a denial-of-service attack during a key negotiation process. When the responder receives a key negotiation request from an initiator, the responder only maintains state if it can verify that the request is sent from a valid IP address. The responder limits the total number of in process key negotiations depending on the trustworthiness of the initiator's IP address. If the responder has at least one established, i.e. successfully negotiated, security association with an initiator using the IP address, the number of permissible negotiations is limited on per port basis for the IP address. If the responder does not have any established security associations for the IP address, the number of permissible negotiations is limited to the IP address regardless of the port.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
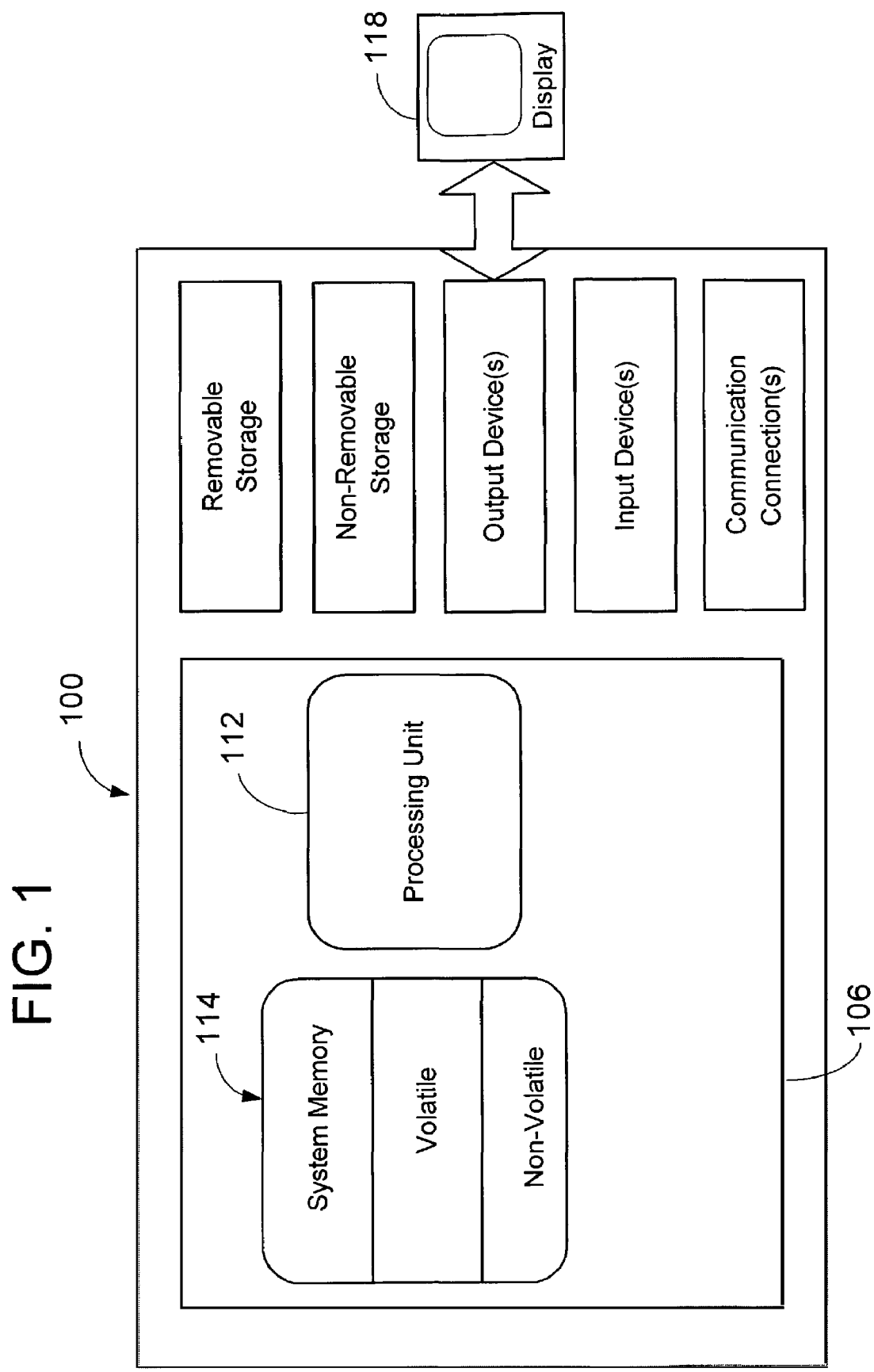
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The present invention may be implemented by programming code modules that are executed by a computer. Generally, program modules include routines, objects, components, data structures and the like that perform particular tasks or implement particular abstract data types. The terms "program" and "module" as used herein may connote a single program module or multiple program modules acting in concert. The invention may be implemented on a variety of types of computers, including personal computers (PCs), telephones, hand-held devices, multi-processor systems, microprocessor-based programmable consumer electronics, network PCs, minicomputers, mainframe computers and the like. The invention may also be employed in thin initiators and distributed computing environments, where tasks are performed by remote processing devices that are linked through a communications network. In a distributed computing environment, modules may be located in both local and remote memory storage devices.

Referring to FIG. 1, an example of a basic configuration for a computer 100 on which a network computer in the system described herein may be implemented is shown. In its most basic configuration, the computer 100 typically includes at least one processing unit 112 and memory 114. Depending on the exact configuration and type of the computer 100, the memory 114 may be volatile (such as RAM), non-volatile (such as ROM or flash memory) or some combination of the two. This most basic configuration is illustrated in FIG. 1 by line 106. Additionally, the computer may also have additional features/functionality. For example, computer 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 100 may also have input devices such as a keyboard, mouse, pen, voice input device, touch input device, etc. Output devices such as a display 116, speakers, a printer, etc.

may also be included. All these devices are well known in the art and need not be discussed at length here.

Figure 2:
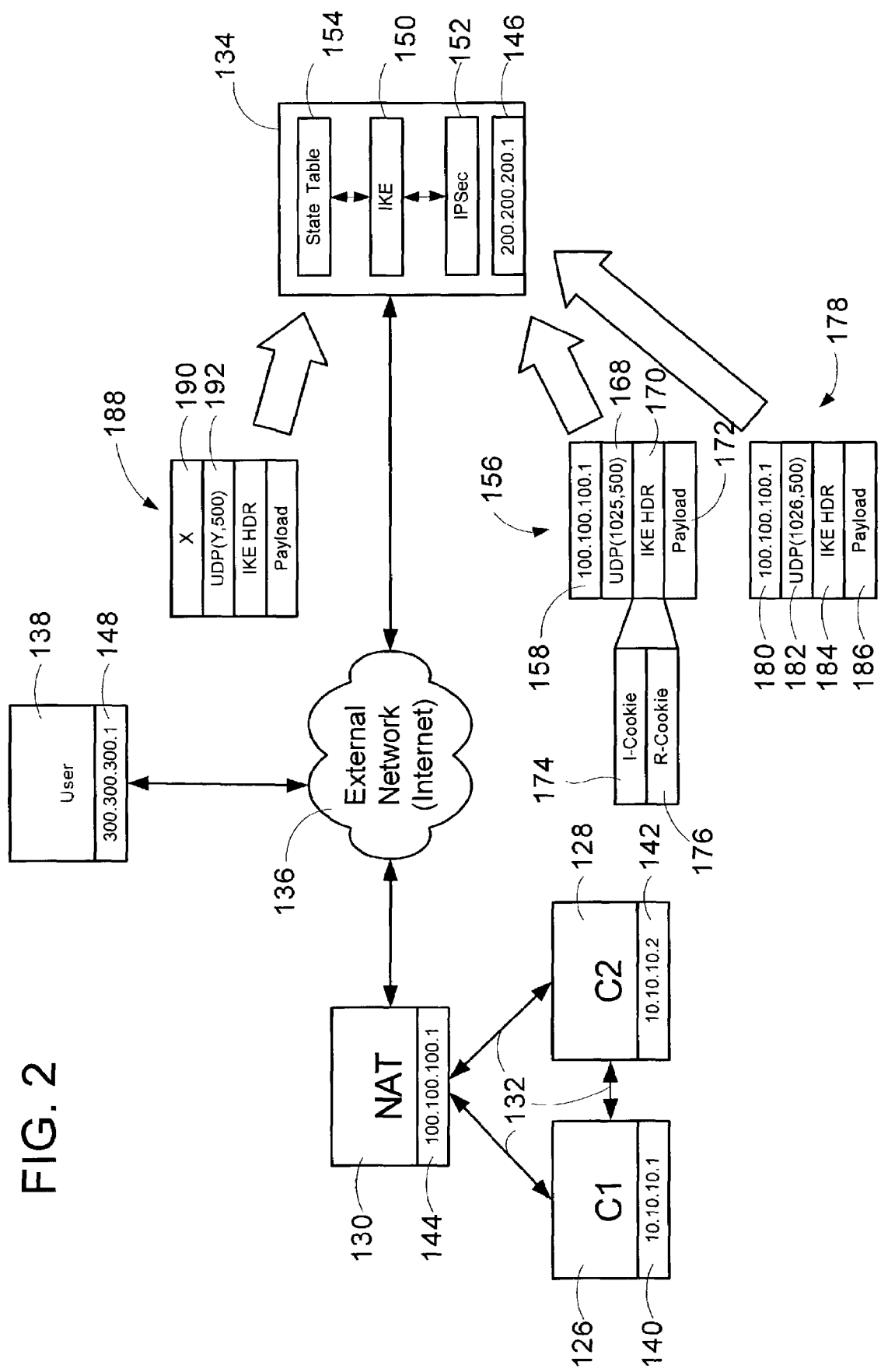
FIG. 2 is a block diagram generally illustrating an exemplary operating environment employing the present invention.

FIG. 2 illustrates an exemplary operating arrangement embodying the present invention. The present invention is directed to a way to prevent a denial-of-service (DOS) attack on a responder by sending false key negotiation requests. For illustration purposes, the invention will be described below in connection with an embodiment that implements the IPSec protocol suite such as the key management and exchange (IKE) protocol. It will be appreciated, however, that the system and method can also be used with other network security protocols, and more specifically, other key negotiation protocols, for solving similar problems.

The arrangement in FIG. 2 includes a plurality of network devices, referred to as initiators 126, 128, and a Network Address Translation device (NAT) 130 connected via internal network 132. The environment also includes an external network 136. A responder 134 and the NAT 130 communicate over the external network 136. Other network devices, such as computer 138, also communicate with the responder 134 over the external network 136. The internal network 132 and external network 136 may be any suitable type such as Local Area Networks (LANs), Wide Area Networks (WANs), intranet, the Internet, or any combination thereof.

The responder 134 and each network device such as initiators 126, 128 and computer 138 are implemented as any suitable computing device such as personal computers, handheld devices, or the like. The NAT 130 may be a dedicated device or may itself be an initiator. It will also be understood by those skilled in the art that, although a limited number of devices are shown connected to the internal network 132 and the external network 136, each network may be connected to many network devices. Furthermore, although not shown, additional NATs may be implemented in the arrangement. For example, the responder 134 may be connected to the external network 136 through a NAT.

Each initiator 126, 128 has a private IP address. For example, the private IP address 140 for the initiator 126 is 10.10.10.1 and the private IP address 142 for initiator 128 is 10.10.10.2. The private IP addresses form valid source and destination addresses for use in IP packets transmitted within the internal network 132. The private IP addresses of initiators 126, 128 are not valid, i.e. not assigned, for use as source and destination IP addresses on the external network 136.

The NAT 130, responder 134, and computer 138 each has a public IP address, labeled 144, 146, 148 respectively. Unlike the private IP addresses 140, 142 of the initiators, the pubic IP addresses 144, 146, 148 are valid for use as source and destination IP addresses on the external network 136.

The NAT 130 forms an interface between the internal network 132 and the external network 136 and permits the initiators 126, 128 to send IP packets to devices such as the responder 134 located on the external network 136. The use of NAT is well known and need not be described in detail herein. However, for the purpose of understanding the present invention, it will be understood that initiators 126, 128 send IP packets destined for devices on the external network 136. The packets are sent onto the internal network 132 and include an IP header with source and destination IP addresses and a transport layer header such as a User Datagram Protocol (UDP) header with source and destination ports. By way of example, initiators 126, 128 transmit packets destined for the responder 134 onto the internal network 132. Each packet includes an IP header with the source IP address which is the private IP address 140, 142 of the initiators and, which as previously described, is not valid on the external network 136. The NAT 130 receives each packet and changes the source IP address to a valid source IP address for use on the external network 136, such as the IP address 144 of the NAT 130. The NAT may also changes the source ports in each packet to ensure that each initiator 126, 128 sends packets with a unique combination of source port and source IP address. The NAT 130 then transmits the modified packets onto the external network 136.

In the manner previously described, the NAT 130 allows both the initiators 126, 128 to send packets onto the external network 136 using a single IP address valid on the external network 136. The unique source port assigned by the NAT 130 permits the responder to distinguish between packets sent from initiator 126 from those sent by initiator 128. The combination of the source IP address and source port also permit the NAT 130 to route response IP packets sent from responder 134 to the proper initiator 126, 128.

To protect the authenticity and confidentiality of data sent from the initiators 126, 128 to the responder 134, the initiators 126, 128 send packets according to a security protocol such as the encapsulating security protocol (ESP). The use of security protocols such as ESP require an established security association (SA). The SA defines parameters such as an authentication algorithm, encryption algorithm, keys, and the lifetime of keys, used by ESP to protect the contents of the IP packet.

The established SA is obtained by using a key negotiation protocol, such as IKE. The IKE protocol includes two phases known as "main mode" and "quick mode." In "main mode," the initiator and the responder establish a secure channel for conducting IKE negotiation, referred to as an IKE SA. In "quick mode," the initiator and the responder negotiate general purpose SAs over the secure channel established in the first phase. Each IKE phase includes a plurality of IKE packets exchanged between the initiator and the responder. Each IKE packet includes a UDP header with source and destination port address values of 500, the Internet Assigned Numbers Authority (IANA) port address for IKE packets. The present invention is concerned with the IKE main mode negotiation process which is used to establish the IKE SA.

The responder 134 includes IKE process 150, IPSec process 152, and state table 154 which facilitate use of the IPSec protocol suite at the responder 134. The IPSec process 152 is used to process packets sent according to the ESP and AH protocols. The IKE process 150 is responsible for conducting IKE negotiations with other devices such as initiators 126, 128. Initiators 126, 128 likewise have a reciprocal IKE process and IPSec process which for simplicity are not shown. The state table 154 is used by the responder 134 to store information such as proposed and agreed upon SAs during the IKE negotiation.

The IKE main mode negotiation process begins when, for example, initiator 126, referred to as initiator, sends an initial IKE request to the responder 134, referred to as responder over the internal network 132. The IKE request includes the UDP header with IANA assigned source and destination port addresses of 500. As previously described, the NAT modifies source IP and port address values and transmits the modified IKE request over the external network 136.

A packet 156 illustrates the IKE request sent from the initiator 126 to the responder 134 following modification by the NAT 130. The packet 156 includes IP header 158, UDP header 168, IKE header 170 and payload data 172 and conforms to the format described in IETF RFC 2409. The IP header 158 is shown in simplified form and includes the address 144 of the NAT 130 as the source IP address. The UDP header, shown in simplified form in field 168 is "UDP (1025,500)." The first number, 1025, in the UDP header represents the source port address, i.e. the port address of the initiator 126, as modified by the NAT 130. The second number in the UDP header, 500, represents the destination port address, i.e. the port address of the responder 134, which is not modified by the NAT 130.

The IKE header 170 includes an I-Cookie 174 value and an R-Cookie 176 value. The I-Cookie value is a unique number assigned by the initiator 126. The R-Cookie value is a unique value assigned by the responder 134. Because the initiator 126 does not know what value the responder 134 will assign for the R-Cookie value, the initial request 156 includes a null value in the R-Cookie field. The payload 176 includes a proposed SA. It will be understood that when the responder 134 responds to the IKE request, the responder 134 includes the R-Cookie value. Thereafter, IKE packets sent from the initiator 126 to the responder 134 include the R-Cookie value assigned by the responder and not the null value included in the initial IKE request.

A packet 178 illustrates an IKE request packet sent from the initiator 128 to the responder 134 following modification by the NAT 130. The IP header 180 includes the IP address 144 of the NAT 130 as the source IP address. The UDP header 182 includes a modified source port address of 1026. The IKE header 184 and payload data 186 includes the same type of information as described for packet 156.

As illustrated above, the implementation of NATs in conjunction with the IPSec protocol suite results in the responder 134 receiving IKE packets with UDP source ports other than the IANA assigned port number of 500. The IKE packets sent from initiators 126, 128 onto the internal network 132 each include UDP headers with source ports of 500. In the case of initiator 126, the NAT modifies the source port address to 1025 as illustrated by field 168 of packet 156. In the case of initiator 128, the NAT 130 modifies the source port address to 1026 as illustrated the field 182 of the packet 178.

The IKE main mode negotiation process proceeds with each initiator 126, 128 and the responder 134 exchanging additional IKE packets with the same general format as shown by packets 156, 158. Once the IKE main negotiation process is complete, the initiators 126, 128 and the responder 134 arrive at the established IKE SA. After the main mode negotiation is complete, the initiators 126, 128 complete the quick mode negotiation to arrive at general purpose SAs, following which the initiators 126, 128 exchange data with the responder 134 using the ESP or AH protocols.

For each IKE main mode negotiation in process, the responder 134 maintains state as required by the IKE protocol. For example, when the initial IKE request is received from initiator 126, the responder 134 stores the proposed SA in state table 154. As the negotiation proceeds, more information is added to the stored state such as key generation data, authentication information etc. For the purpose of understanding the present invention, it is important to note that when the initial IKE requests is received, the responder does not know whether the request is from a device that actually has the IP address identified as the source IP address in the IKE request.

The responder 134 is vulnerable to denial-of-service (DOS) attacks from a malicious user such as the computer 138. As previously described, the responder 134 maintains state for each ongoing IKE main mode negotiation. Accordingly, each IKE request consumes available resources of the responder 134. Malicious user 138 can send fake IKE requests, labeled 188. Each fake IKE request includes a different spoofed IP address "X," labeled 190. The spoofed address is simply a made up IP address, i.e. not the actual IP address 148 of user 138. There are over 4 billion possible source IP addresses. Consequently, the user 138 can send a large number of false IKE requests thereby consuming enough resources of the responder 134 to prevent, or severely limit the ability of, the responder 134 from processing IKE requests from legitimate users.

Moreover, as previously described, the NAT 130 modifies source port addresses. Thus, the responder 134 receives IKE requests with source ports other than port 500. User 138 can send fake IKE requests using over 64,000 different source port numbers "Y," in field 188. Thus, even if responder 134 only maintains state for IP packets sent from a valid, i.e. routable, source IP address, the user 138 can still send a sufficient number of IKE requests to mount a DOS attack.

In accordance with an aspect of the invention, the responder 134 only maintains state when an IKE request is received from an initiating computer with a valid, non-spoofed, source IP address. The responder 134 further limits the number of ongoing IKE negotiations for which the responder maintains state. If an initial IKE request is received from a valid source IP address and the responder has at least one established main mode SA for that source IP address, the responder limits the number of ongoing IKE negotiations to a maximum number on a per port basis for that source IP address. If an established main mode SA does not exist for that source IP address, the responder limits the number of ongoing IKE negotiations to a maximum number based on the source IP address regardless of which source port is included in the IKE request.

Figure 3:
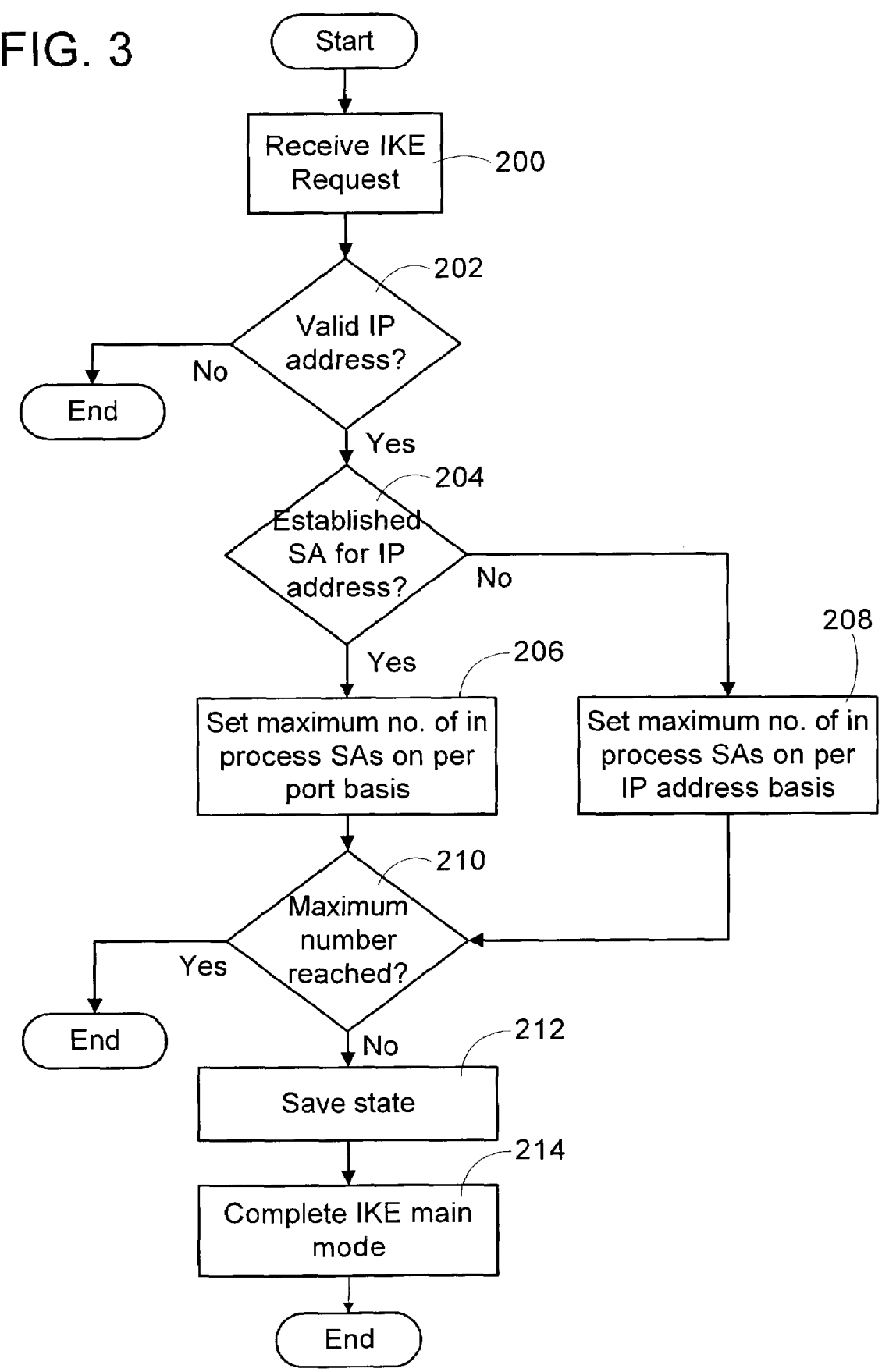
FIG. 3 is flow diagram illustrating an exemplary method implementing the present invention.

Referring to FIG. 3, an example of the method employed according to the present invention will now be described. The method may be implemented in any suitable manner such as part IKE process 150. Alternatively, the method according to FIG. 3 is implemented as a separate process or application executing within the responder 134.

As shown in step 200, the responder 134 receives an initial IKE request from an initiator. In step 202, the responder 134 determines if the initial IKE request was sent from a valid IP address, i.e. the source IP address in the IKE packet is the actual IP address of the device sending the IKE request. Any suitable method can be used for verifying the authenticity of the source IP address. An exemplary method is described below with reference to FIG. 4. If the responder is unable to verify the authenticity of the source IP address, the responder 134 terminates the IKE negotiation and, importantly, does not maintain state based upon the IKE request.

Once the responder 134 verifies the authenticity of the source IP address, the responder 134 determines whether any established main mode SAs exist for the source IP address as shown in step 204. If at least one established main mode SA exists, the responder limits the maximum number of in process IKE negotiations on a per port basis for that source IP address as shown in step 206. By way of example, the responder 134 limits the number of in process IKE negations to a maximum of 6 per port. Conversely, if no established main mode SAs exist for the source IP address, the responder 134 limits the number of in process IKE negotiations to a maximum number based on the IP address regardless of the source port as shown in step 208. For example, the responder 134 limits the number of in process IKE negotiations to a maximum of 30 for the IP address regardless of source port.

As a specific example, assume that no established main mode SAs exist for an initiating computer with the IP address of the NAT 130. Initiator 126 sends an initial IKE request to the responder 134. After verifying the authenticity of the IP address in the IKE request, the responder 134 determines that no main mode SAs exist for the source IP address 100.100.100.1 and accordingly limits the number of in process IKE negations to 30 for the source IP address 100.100.100.1. Thus, the initiators 126, 128, and any other initiators operating behind NAT 130 can initiate additional in process IKE main mode negotiations until the maximum of 30 reached.

At some point, the initiator 126 successfully negotiates an established main mode SA with the responder 134. After that occurs, the responder 134 limits the maximum number of in process IKE negotiations from any device using the IP address of the NAT 130 based on the port and not the IP address. For example, the initiator 128 can have up to 6 in process IKE negotiations with the responder 134 even if the initiator 128 has not successfully negotiated an established main mode SA. The foregoing anticipates that once the initiator 126 establishes a main mode SA, other initiators, such as the initiator 128 operating behind the NAT 130 are considered trustworthy.

Once the responder 134 sets the limit on the number of in process IKE negotiations, either on a per port basis or per IP address basis for a given source IP address, the responder 134 determines whether the maximum number has been reached as shown in step 210. If the maximum has been reached, the responder 134 does not maintain state and does not proceed with the IKE main mode negotiation. Alternatively, the responder 134 can deprecate one of the in process IKE negotiations and proceed to process the pending IKE negotiation.

If the maximum number has not been reached or if the responder 134 elects to process the pending IKE negotiation by deprecating an older in process IKE negotiation, the responder 134 begins to maintain state by saving the proposed SA in the IKE request as shown in step 212. The responder 134 then completes the IKE main mode negotiation according to the IKE protocol as shown in step 214.

Figure 4:
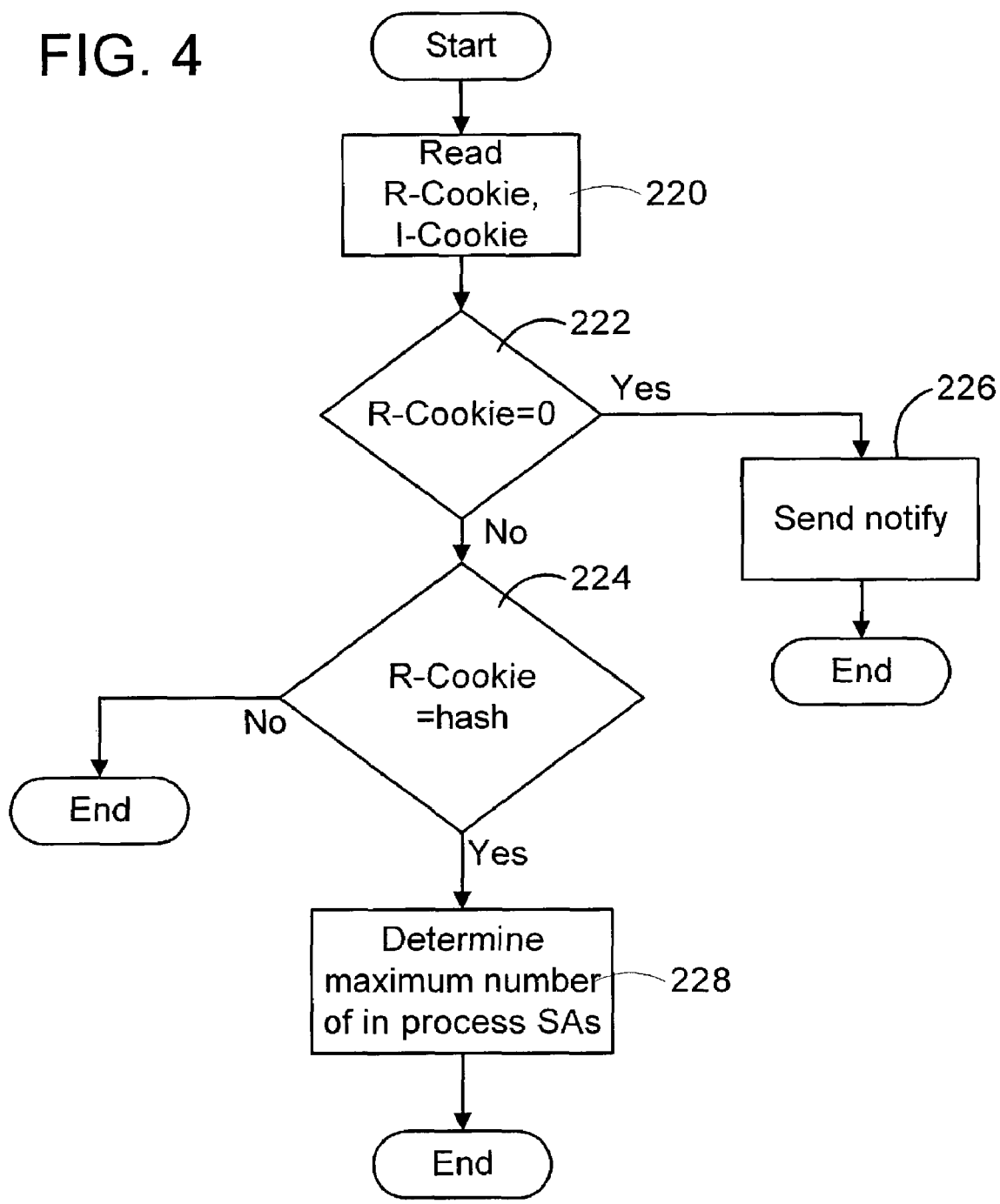
FIG. 4 is flow diagram illustrating an exemplary method implementing the present invention.

Referring to FIG. 4, a method is shown for verifying the authenticity of the initiating computer sending the initial IKE request. In step 220, the responder reads the R-Cookie and I-Cookie values in the IKE header of the IKE request. The responder determines whether the R-Cookie value is zero as shown in step 222. If the R-Cookie value is zero, the responder does not maintain state, i.e. does not store any information based on the IKE request. Instead, the responder 134 sends a response IKE packet with a notify payload as shown in step 226. The notify includes an R-Cookie value. The R-Cookie is calculated based upon a hash function of values including the I-Cookie, the initiator IP address and the initiator port, and some other secret value known only to responder 134. The hash function may be based on additional values such as a time of day periodically updated to prevent the R-Cookie from being replayed. The notify also informs the initiator to resend the IKE request with the R-Cookie value.

If the R-Cookie value is not zero, as determined in step 222, the responder 134 recalculates the hash function using the IKE request packet parameters and compares the R-Cookie value to the recalculated hash function as shown in step 224. If the values do not match, the responder 134 disregards the IKE request. If the values match, the responder 134 determines that the IKE request was sent from a valid source, i.e. a computer that received the notify from the responder 134 and responded with the proper R-Cookie value. The responder then proceeds to set maximum number of permissible in-process IKE negotiations for the source IP address as shown in step 228 using any suitable method such as that described with reference to FIG. 3.

The method described prevents a DOS attack at the responder 134 from malicious user 138. Because the responder 134 only maintains state for IKE requests sent from a valid source IP address, the user 138 must come from its own IP address, namely 300.300.300.1. Furthermore, because the user 138 never establishes a main mode SA, the responder 134 limits the number of ongoing IKE negotiations with the user 138 to a maximum based upon its IP address alone. This number is set to a value, such as 30, that is insufficient to allow the user 138 to successfully mount a DOS attack.

The method described is further suitable for network environments using NAT. Before any of the initiators behind the NAT establish a main mode SA, the responder 134 limits the number of ongoing negotiations with initiators behind the NAT to a suitable number, for example 30, which is sufficient to permit a number of initiators behind the NAT to initiate IKE negotiations while the responder 134 waits for at least one initiator to establish a main mode SA. Once the main mode SA is established, initiators behind the NAT can initiate more in process SAs as the limit is increased to a per port limitation. Thus, the method is flexible enough to accommodate NAT environments while protecting the responder 134 against DOS attacks.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method for preventing a denial-of-service attack at a responder connected to a network during an IKE negotiation, the IKE negotiation used to establish a security association and including an initial IKE negotiation request designating a source port and a source IP address, the method comprising:

receiving the initial IKE negotiation request from an initiator;

determining that the source IP address is a valid IP address;

determining whether an established security association exists for the source IP address; and setting a limit on a maximum number of IKE negotiations designating the source IP address when it is determined that the established security association does not exist for the source IP address.

2. The method of claim 1, wherein the step of determining that the source IP address is a valid IP address further comprises:

sending a response message to the initiator, the response message including a unique value assigned by the responder, the unique value being a function of data provided by the initiator and a secret value known to the responder and including a request for the initiator to resend the initial negotiation request with the unique value; and receiving a second IKE negotiation request from the initiator that includes the unique value.

3. The method of claim 2, wherein the unique value is an R-Cookie.

4. The method of claim 1, wherein the responder has the established security association for the source IP address and whereby the step of setting the limit on the maximum number of IKE negotiations designating the source IP address comprises setting the limit on the number of IKE negotiations to a maximum based upon the port of the initiator.

5. The method of claim 1, wherein the responder does not have the established security association for the source IP address and whereby the step of setting the limit on the maximum number of IKE negotiations designating the source IP address comprises limiting the number of IKE negotiations to a maximum based upon the source IP address of the initiator.

6. The method of claim 1, wherein at least one of the responder or the initiator operates behind a NAT.

7. The method of claim 1, wherein the network includes at least one network address translation device and wherein the network address translation device modifies a source IP address and a source port in the IKE negotiations.

8. A method of preventing denial of service attacks at a responding computer in a network environment comprising a network address translation (NAT) and a plurality of initiating computers, the NAT forming an interface between the plurality of initiating computers and the responding computer, the method comprising:
   when it is determined that a security association does not exist for an IP address of the NAT, setting a limit on a maximum number of permissible IKE negotiations between the responding computer and the plurality of initiating computers based upon the IP address of the NAT;
   establishing a security association with at least one of the initiating computers; and
   when the security association is established, modifying the limit on the maximum number of permissible IKE negotiations between the responding computer and the plurality of initiating computers on a per port basis.

9. The method of claim 8, farther comprising: verifying that the IP address of the NAT is a valid IP address.

10. The method of claim 9, wherein the step of determining that the IP address of the NAT is a valid IP address comprises:
   sending a message to at least one of the initiating computers that includes a unique value assigned by the responding computer, the unique value being a function of data provided by the initiating computer and a secret value known to the responding computer and including a request for the at least one of the initiating computers to respond with an IKE negotiation request including the unique value; and
   receiving a response from the at least one of the initiating computers that includes the unique value.

11. The method of claim 8, wherein the IKE negotiations conform to an IKE protocol.

12. A computer-readable medium having stored thereon computer-readable instructions for preventing a denial-of-service attack at a responder connected to a network during an IKE negotiation, the IKE negotiation used to establish a security association and including an initial IKE negotiation request designating a source port and a source IP address, the computer-readable instructions, when executed, perform steps comprising:
   receiving the initial IKE negotiation request from an initiator;
   determining that the source IP address is a valid IP address;
   determining whether an established security association exists for the source IP address; and
   setting a limit on a maximum number of IKE negotiations designating the source IP address when it is determined that the established security association does not exist for the source IP address.

13. The computer-readable medium of claim 12, wherein the step of determining that the source IP address is a valid IP address further comprises:
   sending a response message to the initiator, the response message including a unique value assigned by the responder, the unique value being a function of data provided by the initiator and a secret value known to the responder and including a request for the initiator to resend the initial negotiation request with the unique value; and
   receiving a second IKE negotiation request from the initiator that includes the unique value.

14. The computer-readable medium of claim 13, wherein the unique value is an R-Cookie.

15. The computer-readable medium of claim 12, wherein the responder has the established security association for the source IP address and whereby the step of setting the limit on the maximum number of IKE negotiations designating the source IP address comprises setting the limit on the number of IKE negotiations to a maximum based upon the port of the initiator.

16. The computer-readable medium of claim 12, wherein the responder does not have the established security association for the source IP address and whereby the step of setting the limit on the maximum number of IKE negotiations designating the source IP address comprises limiting the number of IKE negotiations to a maximum based upon the source IP address of the initiator.

17. A computer-readable medium for executing computer-readable instructions for preventing denial of service attacks at a responding computer in a network environment comprising a network address translation (NAT) and a plurality of initiating computers, the NAT forming an interface between the initiating computers and the responding computer, the computer-readable instructions, when executed, perform steps comprising:
   when it is determined that a security association does not exist for an IP address of the NAT, setting a limit on a maximum number of permissible IKE negotiations between the responding computer and the plurality of initiating computers based upon the IP address of the NAT;
   establishing a security association with at least one of the initiating computers; and
   when the security association is established, modifying the limit on the maximum number of permissible IKE negotiations between the responding computer and the plurality of initiating computers on a per port basis.

18. The computer-readable medium of claim 17, wherein the computer-readable instructions, when executed, perform steps further comprising: determining that the IP address of the NAT is a valid IP address.

19. The computer-readable medium of claim 18, wherein the step of determining that the IP address of the NAT is a valid IP address comprises:
   sending a message to at least one of the initiating computers that includes a unique value assigned by the responding computer, the unique value being a function of data provided by the initiating computer and a secret value known to the responding computer and including a request for the at least one of the initiating computers to respond with an IKE negotiation request including the unique value; and
   receiving a response from the at least one of the initiating computers that includes the unique value.

* * * * *